(12) United States Patent
Finn et al.

(10) Patent No.: US 8,964,029 B2
(45) Date of Patent: Feb. 24, 2015

(54) METHOD AND DEVICE FOR CONSISTENT REGION OF INTEREST

(75) Inventors: Alan M. Finn, Hebron, CT (US); Pengju Kang, Yorktown Heights, NY (US); Ziyou Xiong, West Hartford, CT (US); Lin Lin, Manchester, CT (US); Pei-Yuan Peng, Ellington, CT (US); Meghna Misra, Bolton, CT (US); Christian Maria Netter, West Hartford, CT (US)

(73) Assignee: Chubb Protection Corporation, Farmington, CT (US)

( * ) Notice: Subject to any disclaimer, the term of this patent is extended or adjusted under 35 U.S.C. 154(b) by 1585 days.

(21) Appl. No.: 11/919,541

(22) PCT Filed: Apr. 29, 2005

(86) PCT No.: PCT/US2005/014854
§ 371 (c)(1),
(2), (4) Date: Feb. 11, 2008

(87) PCT Pub. No.: WO2006/118563
PCT Pub. Date: Nov. 9, 2006

(65) Prior Publication Data
US 2009/0086022 A1    Apr. 2, 2009

(51) Int. Cl.
*H04N 7/18* (2006.01)
*G06K 9/36* (2006.01)
*G08B 13/196* (2006.01)

(52) U.S. Cl.
CPC ...... *G08B 13/19652* (2013.01); *G08B 13/1963* (2013.01); *G08B 13/19689* (2013.01)

USPC .......................................... 348/143; 382/236

(58) Field of Classification Search
USPC ....................................................... 348/143
See application file for complete search history.

(56) References Cited

U.S. PATENT DOCUMENTS

| 5,365,269 A | 11/1994 | Holmes et al. |
| 5,446,492 A | 8/1995 | Wolf et al. |
| 5,521,634 A * | 5/1996 | McGary .................. 348/169 |
| 5,835,163 A | 11/1998 | Liou et al. |

(Continued)

FOREIGN PATENT DOCUMENTS

EP    0261917    9/1987

OTHER PUBLICATIONS

Reddy et al., "An FFT-Based Technique for Translation, Rotation, and Scale-Invariant Image Registration", Aug. 1996, IEEE Trans. Image Proc., v. 5, pp. 1266-1271.

(Continued)

*Primary Examiner* — Andy Rao
*Assistant Examiner* — James Edwards
(74) *Attorney, Agent, or Firm* — Cantor Colburn LLP

(57) ABSTRACT

The present invention describes a system and method for surveillance cameras that maintain proper mapping of a mapped region of interest with an imaged region of interest based on feedback received regarding the current orientation of a surveillance camera. The system or method first determines the location of the imaged region of interest within the surveillance camera's imaged current field of view based on mechanical or imaged feedback, or a combination of both. The system or method then remaps the mapped region of interest within the surveillance camera's imaged current field of view such that the mapped region of interest is coextensive with the imaged region of interest.

10 Claims, 9 Drawing Sheets

(56) References Cited

U.S. PATENT DOCUMENTS

| | | | |
|---|---|---|---|
| 5,875,305 | A | 2/1999 | Winter et al. |
| 6,177,955 | B1 * | 1/2001 | Downen et al. ............... 348/189 |
| 6,215,519 | B1 * | 4/2001 | Nayar et al. .................. 348/159 |
| 6,496,221 | B1 | 12/2002 | Wolf et al. |
| 6,757,434 | B2 * | 6/2004 | Miled et al. ................... 382/236 |
| 6,859,549 | B1 | 2/2005 | Oliensis |
| 7,411,610 | B2 * | 8/2008 | Doyle ........................ 348/211.8 |
| 2002/0008758 | A1 * | 1/2002 | Broemmelsiek et al. ..... 348/143 |
| 2002/0030741 | A1 * | 3/2002 | Broemmelsiek .............. 348/169 |
| 2004/0119819 | A1 | 6/2004 | Aggarwal et al. |
| 2005/0104958 | A1 * | 5/2005 | Egnal et al. ................... 348/143 |
| 2006/0215753 | A1 * | 9/2006 | Lee et al. ................. 375/240.08 |
| 2009/0080715 | A1 * | 3/2009 | van Beek et al. ............. 382/118 |
| 2010/0013917 | A1 * | 1/2010 | Hanna et al. .................. 348/143 |
| 2010/0238266 | A1 * | 9/2010 | Jojic et al. ........................ 348/36 |
| 2012/0038776 | A1 * | 2/2012 | Ahiska et al. ................. 348/159 |
| 2013/0021434 | A1 * | 1/2013 | Ahiska ............................ 348/36 |

OTHER PUBLICATIONS

Candocia, "Synthesizing a Panoramic Scene with a Common Exposure via the Simultaneous Registration of Images", May 23-24, 2002, FCRAR 2002.

H. Stone, et al., "Subpixel Registration of Images", 1999.

Wolf et al., "Low Bandwith Reduced Reference Video Quality Monitoring System", Institute for Telecommunication Sciences (ITS), Mar. 3, 1999.

Watson et al., "Design and Performance of a Digital Video Quality Metric", NASA Ames Research Center.

Javürek, "Efficient Models for Objective Video Quality Assessment", Dept. of Radio Electronics, Czech Technical University, pp. 48-50, Dec. 2004.

Wolf et al., "In-Service Performance Metrics for MPEG-2 Video Systems", Institute for Telecommunication Sciences.

Lim et al., "Detection of Out-of-Focus Digital Photgraphs", Hewlett-Packard Laboratories, Jan. 20, 2005.

Harasse et al., "Automated Camera Dysfunctions Detection".

Ben-Ezra et al., "Motion-Based Motion Deblurring", Jun. 2004, IEEE Transactions on Pattern Analysis and Machine Intelligence, vol. 26, No. 6, pp. 689-698.

Marichal et al., "Blur Determination in the Compressed Domain Using DCT Information", Summer 1998.

Pinson et al., "A New Standardized Method for Objectively Measuring Video Quality", Nov. 19, 2003.

Ryan, "Applications of the Wavelet Transform in Image Processing", Nov. 12, 2004.

Jang et al., "A Real-Time Identification Method on Motion and Out-of-Focus Blur for a Video Camera", Mar. 17, 1994, pp. 145-153.

* cited by examiner

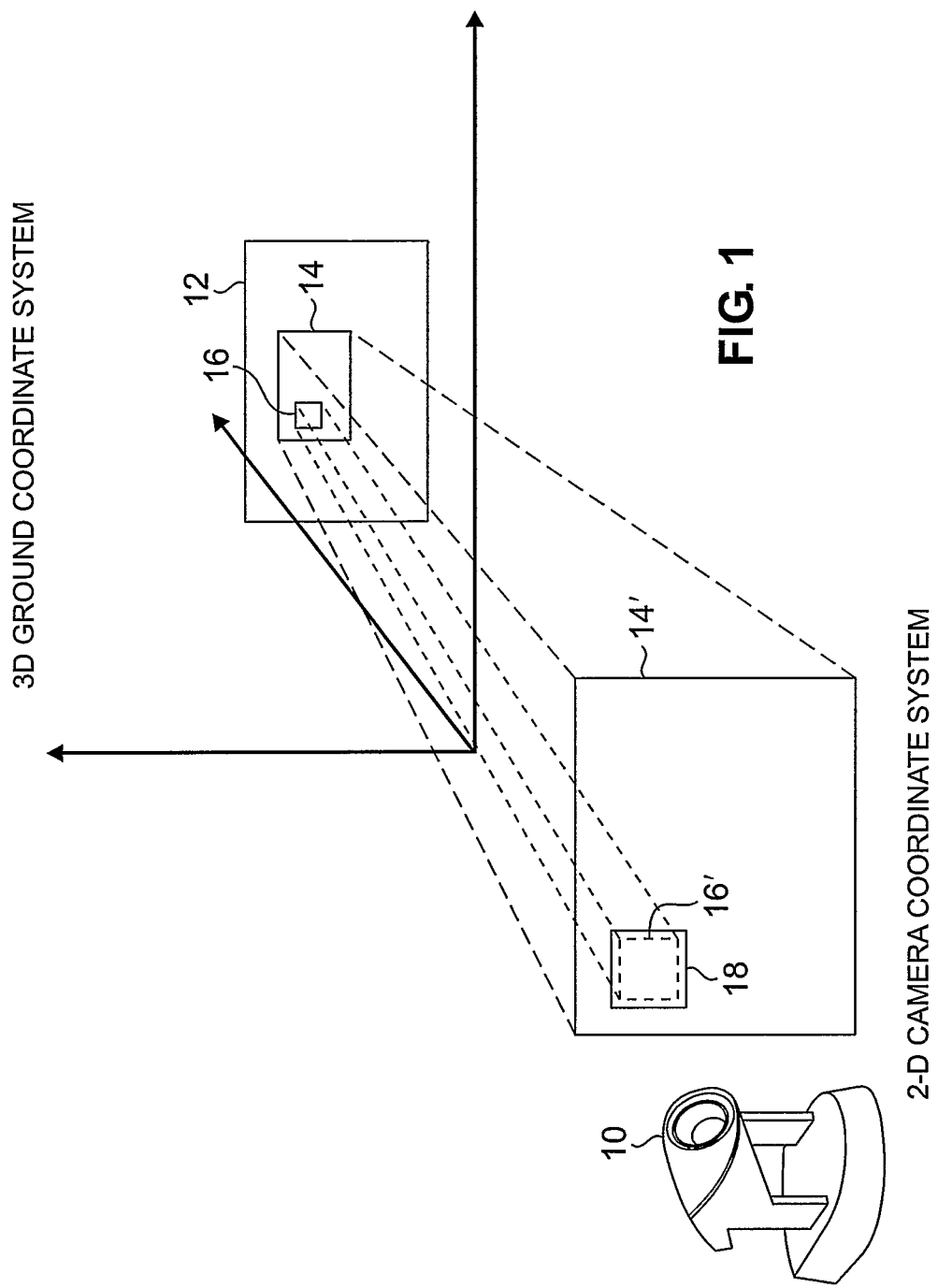

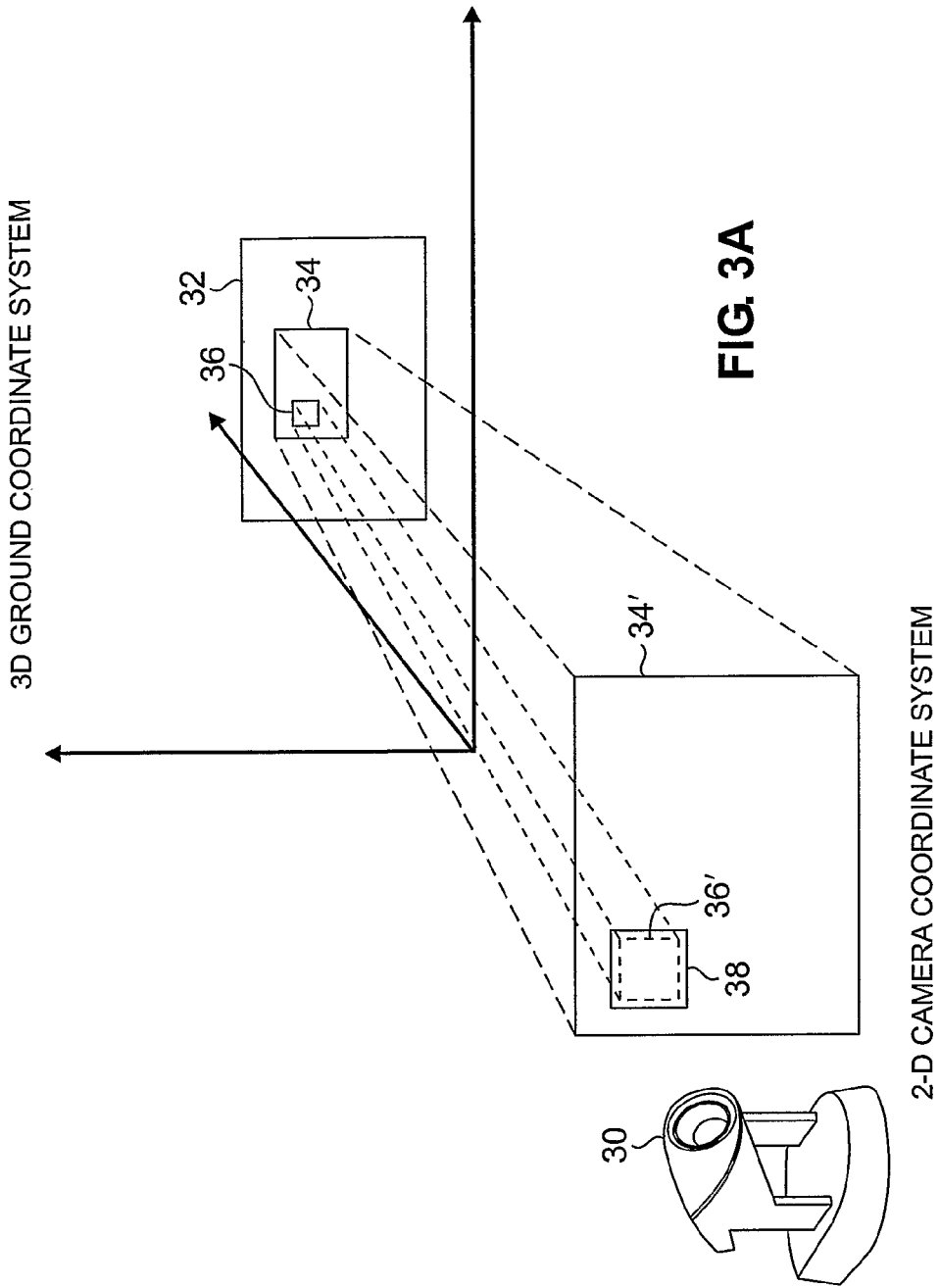

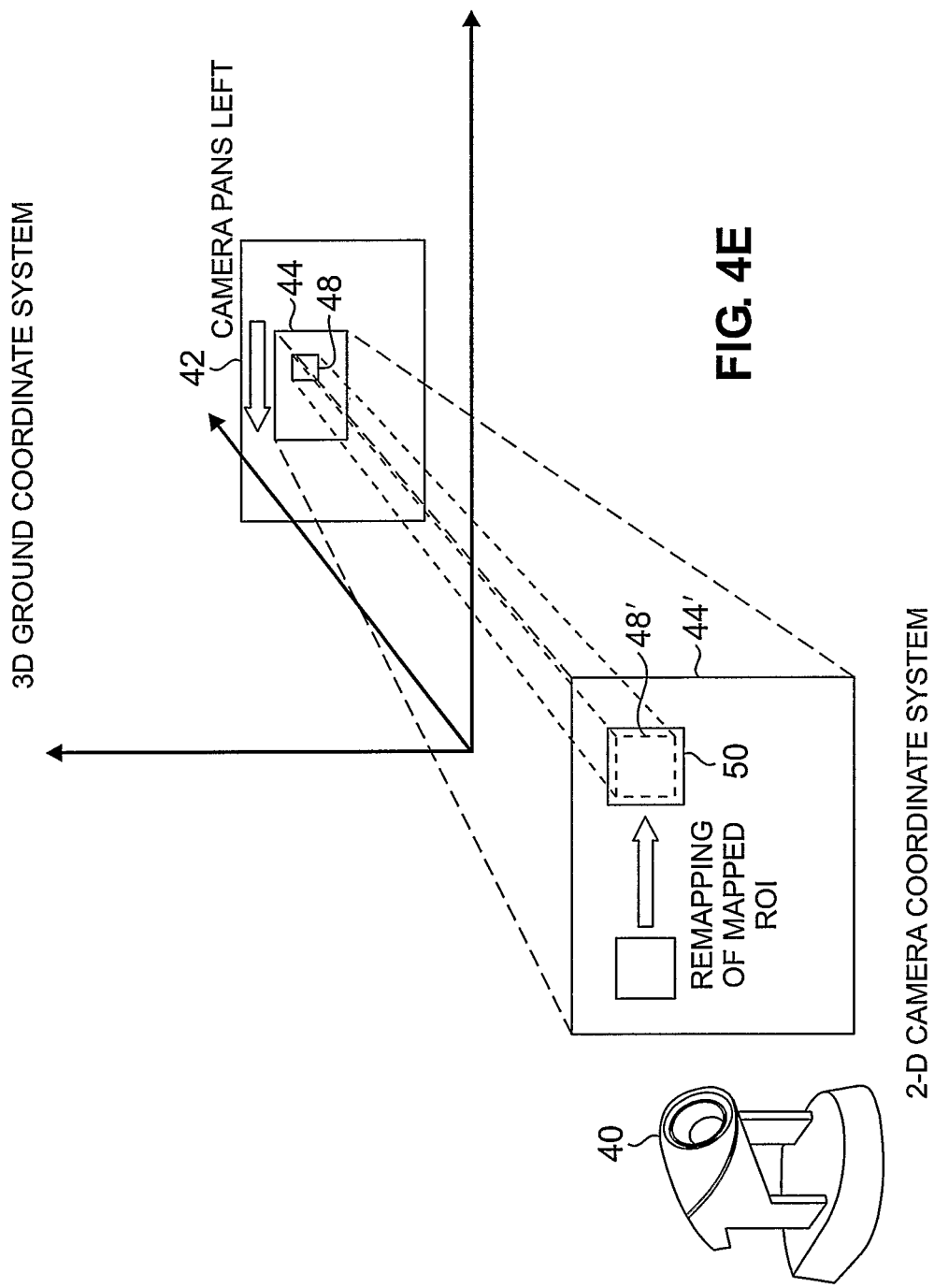

METHOD AND DEVICE FOR CONSISTENT REGION OF INTEREST

BACKGROUND OF THE INVENTION

Many surveillance cameras today are capable of movement in one or more directions, increasing the entire field of view available to the camera. A single surveillance camera is thus able to monitor a larger observable area than would be possible for a stationary surveillance camera.

Within the physical area observed by the surveillance camera, particular "regions of interest" may be selected. The surveillance cameras provide additional video processing to images corresponding with a region of interest. One common video processing technique utilized in surveillance cameras is motion detection. For instance, many surveillance cameras, although capable of viewing larger areas, are concerned with motion detected in one area (e.g., a doorway). By defining regions of interest, surveillance systems are prevented from processing unnecessary video data not corresponding to a region of interest.

In the prior art, a mapped region of interest is defined within the camera's field of view such that it is coextensive with the region of interest (i.e., the image of the region of interest as seen by the surveillance camera). For instance, a mapped region of interest is designated by denoting a rectangle on a monitor displaying the current view of a camera. The area within the rectangle is the mapped region of interest. The mapped region of interest in the prior art is fixed with respect to the camera, therefore any movement of the surveillance camera results in a disconnect between the region of interest and the mapped region of interest, resulting in additional video processing being provided to an undesired area (i.e., not the region of interest).

BRIEF SUMMARY OF THE INVENTION

The present invention relates generally to a method and device for consistently locating a region of interest. More specifically, the present invention locates the designated region of interest based on image feedback provided by the surveillance camera and/or mechanical feedback based on the motion of the surveillance camera. Locating the region of interest, and corresponding image as projected onto the camera's current field of view, allows proper mapping of a mapped region of interest (designating portion of current field of view to receive further processing) to be coextensive with the region of interest.

BRIEF DESCRIPTION OF THE DRAWINGS

FIG. 1 is a perspective view illustrating a pan, tilt, and zoom (PTZ) camera and corresponding current viewing frame of the camera with selected region of interest mapped onto an entire possible field of view available to the camera.

FIGS. 3A-3B are perspective views illustrating an embodiment of a PTZ camera, in which the proper region of interest focus is maintained during camera movement.

FIGS. 4A-4E are perspective views illustrating another embodiment a PTZ camera, in which the region of interest is maintained during camera movement.

DETAILED DESCRIPTION

Figure 2A:
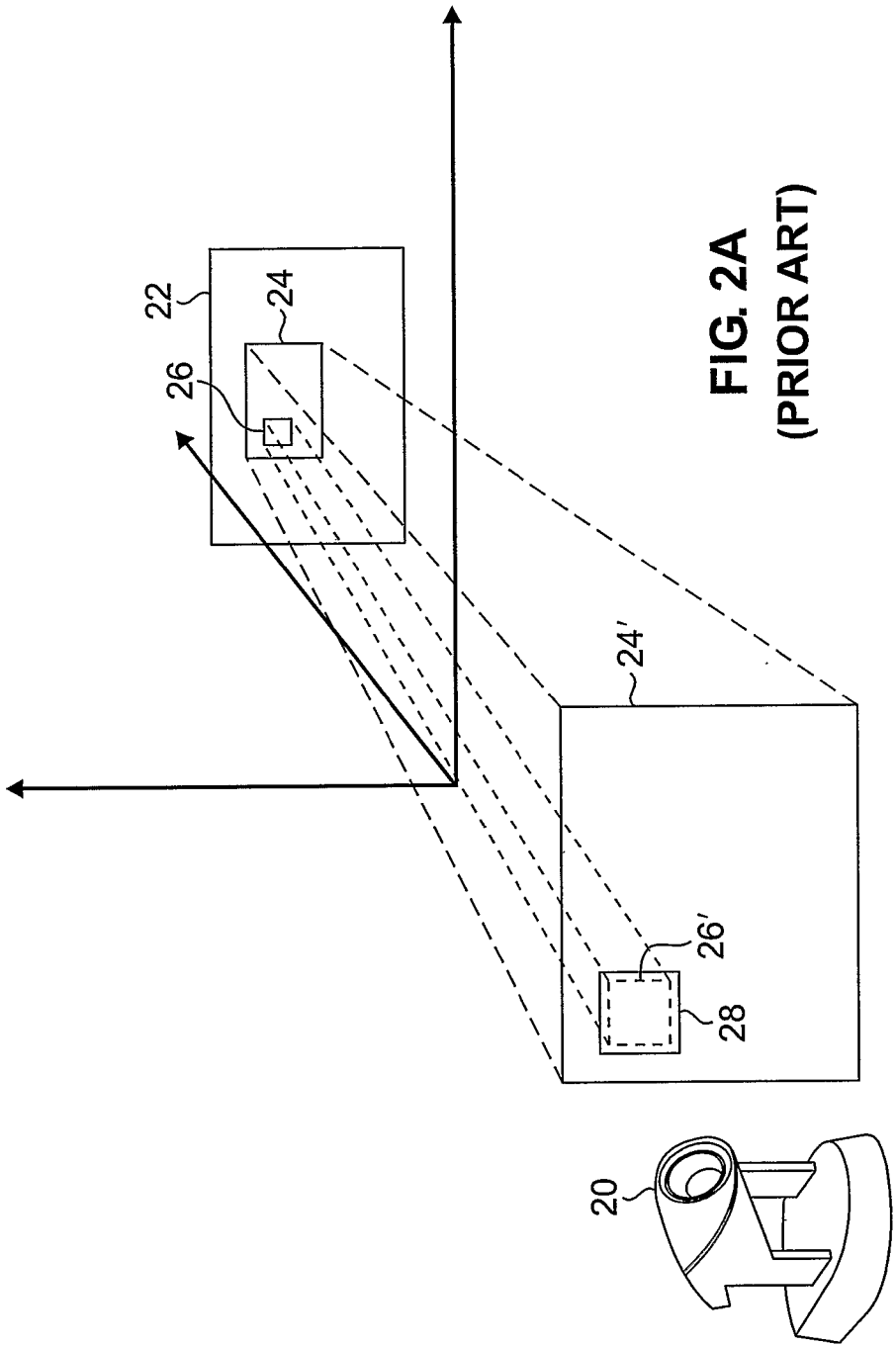
FIGS. 2A-2B are perspective views illustrating a PTZ camera of the prior art, and the effect moving the camera has on a region of interest defined with respect to the current field of view of the camera.

FIG. 1 shows PTZ surveillance camera ("camera") 10 and diagrams illustrating entire possible field of view 12, camera's current field of view 14 within entire possible field of view 12 at present pan, tilt, and zoom settings, and region of interest 16 all within the 3-D ground coordinate system ("ground coordinate system"). Current field of view 14 and region of interest 16 are projected as images to the 2-D camera coordinate system ("camera coordinate system") as imaged current field of view 14' and imaged region of interest 16'. The camera coordinate system frames the imaged current field of view 14'. While imaged current field of view 14' changes as camera 10 pans, tilts and zooms, the camera coordinate system and elements defined with respect to the camera coordinate system remain constant. Mapped region of interest 18 is defined with respect to the camera coordinate system, and refers to the area selected by camera 10 that requires further video processing. As shown in FIG. 1, mapped region of interest 18 and imaged region of interest 16' are coextensive, resulting in imaged region of interest 16' being selected for further video processing, as desired. If mapped region of interest 18 and imaged region of interest 16' become disconnected, video image data being selected for further video processing (selected based on mapped region of interest 18) does not correspond to region of interest 16. Throughout the remainder of the discussion, discussion within the ground coordinate system will be described with unprimed numbers, and discussion of resulting images from the ground coordinate system as mapped onto the camera coordinate system are defined with primed numbers.

Figure 2B:
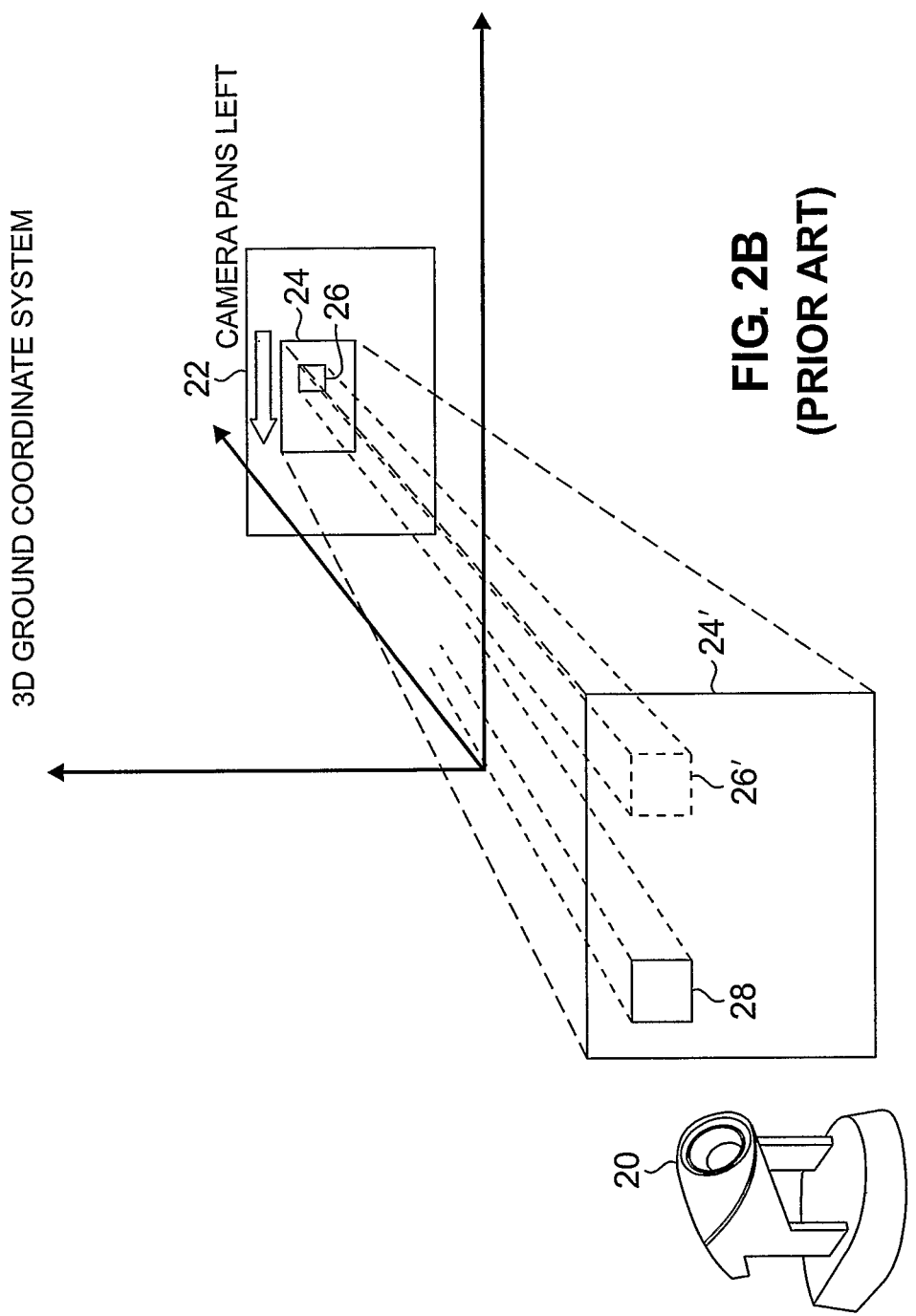

It is therefore important that mapped region of interest 18 be selected to correspond with imaged region of interest 16' within the camera coordinate system. As shown in FIGS. 2A-2B, setting the mapped region of interest with respect to a camera's current field of view as done in the prior art results in a disconnect between the imaged region of interest and the mapped region of interest if the camera moves. In the present invention, the mapped region of interest is remapped based on feedback to maintain coextensive scope of the mapped region of interest and imaged region of interest.

FIGS. 2A-2B show the operation of PTZ camera 20 as is known in the prior art. FIG. 2A shows entire field of view 22 available to camera 20, current field of view 24 of camera 20, and region of interest 26 all represented within the ground coordinate system. Imaged current field of view 24' and imaged region of interest 26' are shown within the camera coordinate system. Imaged region of interest 26' is again shown with a dashed line. Mapped region of interest 28 is selected with respect to the camera coordinate system, shown as a solid line. Imaged region of interest 26' and mapped region of interest 28 are initially located within the upper right quadrant of imaged current field of view 24'. Initially, mapped region of interest 28 is selected such that it is coextensive with imaged region of interest 26'. Because mapped region of interest 28 and imaged region of interest 26' are coextensive, additional video processing will be provided to video data corresponding with actual region of interest 26. It should be noted, that in the prior art, the location of region of interest 26 is in no way determinable. The selection of region of interest 26 for further video processing is not based on the location of region of interest 26, but rather on the location in the camera coordinate system of mapped region of interest 28, which remains constant with respect to the camera coordinate system.

FIG. 2B illustrates camera 20 panning to the left, and the result it has on monitoring of region of interest 26. Because mapped region of interest 28 is defined with respect to the camera coordinate system, mapped region of interest 28 remains fixed on the same location within the camera coordinate system (i.e., in the upper left hand quadrant as shown in FIG. 2B). As camera 20 pans to the left (resulting in current field of view 24 panning to the left with respect to the ground coordinate system), region of interest 26 appears in the upper right quadrant of current field of view 24. Likewise, imaged region of interest 26' moves to the right with respect to the camera coordinate system, resulting in imaged region of interest 26' being located in the upper right quadrant of the camera coordinate system (as well as the upper right hand quadrant of imaged current field of view 24'). Because mapped region of interest 28 is defined with respect to the camera coordinate system, there is now a disconnect between the mapped region of interest 28 and imaged region of interest 26'. Mapped region of interest 28 no longer overlaps imaged region of interest 26', and therefore region of interest 26 is no longer being properly monitored by camera 20. Therefore, after camera 20 moves (either by panning, tilting or zooming) mapped region of interest 28 no longer captures video corresponding with region of interest 26.

Figure 3B:
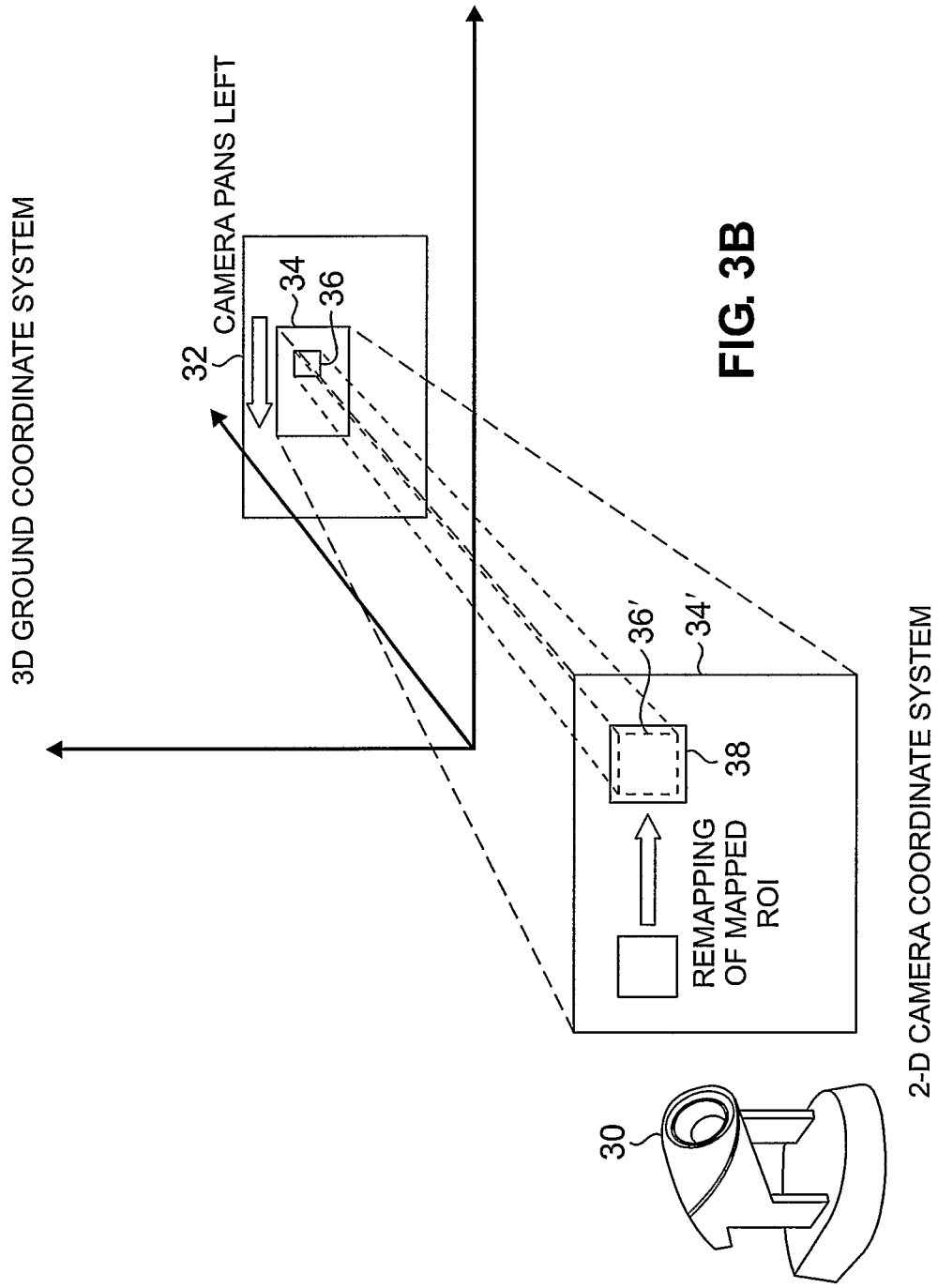

FIGS. 3A-3B shows an embodiment of the present invention that uses mechanical feedback regarding motion of the surveillance camera to determine the proper location of the mapped region of interest.

In FIG. 3A, PTZ surveillance camera (camera) 30 is shown, with entire possible field of view 32, current field of view 34 of camera 30, and region of interest 36 shown in the 3-D ground coordinate system. Imaged current field of view 34' and imaged region of interest 36' are projected onto the 2-D camera coordinate system. Mapped region of interest 38 is selected such that mapped region of interest 38 is coextensive with imaged region of interest 36'. In this embodiment, location of region of interest 36 is defined with respect to the ground coordinate system (likewise, location of imaged region of interest 36' is defined with respect to the camera coordinate system). With defined locations, movement of camera 30 can be taken into account such that mapped region of interest 38 can be properly remapped to be coextensive with imaged region of interest 36'.

FIG. 3B shows camera 30 panning to the left. As camera 30 pans to the left, current field of view 34 moves to the left within the ground coordinate system. Region of interest 36 within the ground coordinate system remains constant as current field of view 34 moves, and is now located in the upper right quadrant of current field of view 34. Likewise, imaged region of interest 36' within the camera coordinate system moves to the right as camera 30 pans to the left, and is now located in the upper right quadrant of imaged current field of view 34'. The motion of camera 30 shown in this embodiment illustrates how imaged region of interest 36' moves inversely to camera motion. Taking advantage of this predictable relationship, feedback regarding motion of camera 30 is used to determine where to locate mapped region of interest 38. The feedback might consist of the commanded camera pan, tilt, and zoom, or might consist of feedback from the camera of its actual mechanical motion. As camera 30 pans to the left, mechanical feedback is provided indicating the direction and magnitude of camera 30's movement. Mapped region of interest 38 is remapped to the right (inverse to the movement of camera 30). In this way, mapped region of interest 38 is maintained in a location coextensive with imaged region of interest 36'.

Although not shown in FIGS. 3A-3B, other types of motion work in a similar manner. If camera 30 is tilted upwards, resulting in imaged region of interest 36' moving downward within the camera coordinate system, mapped region of interest 38 would also be remapped downward. Similarly, if camera 30 zooms in (increases magnification) then current field of view 34 within the ground coordinate system will shrink in size and imaged region of interest 36' within the camera coordinate system will increase in size. Mapped region of interest 38 is therefore increased in size to so that it is again coextensive with imaged region of interest 36'. If camera 30 moves such that region of interest 36 is no longer within current field of view 34, then remapping of mapped region of interest 38 results in mapped region of interest 38 moving out of imaged current field of view 34'. In this case, no portion of current field of view is selected for further video processing as a region of interest. If camera 30 subsequently moves such that mapped region of interest 36 is again within the current field of view 34, then remapping of mapped region of interest 38 results in mapped region of interest 38 being again within imaged current field of view 34' and further video processing resumes.

Figure 4B:
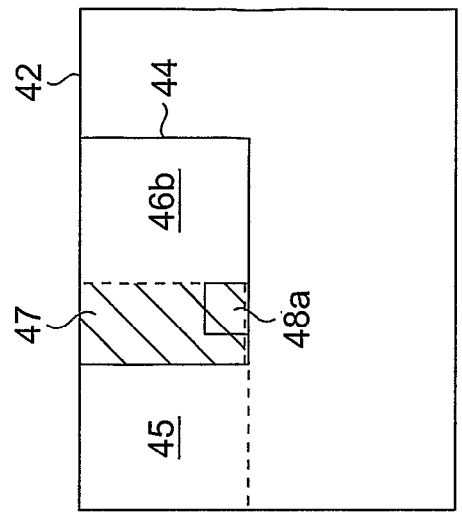
Figure 4A:
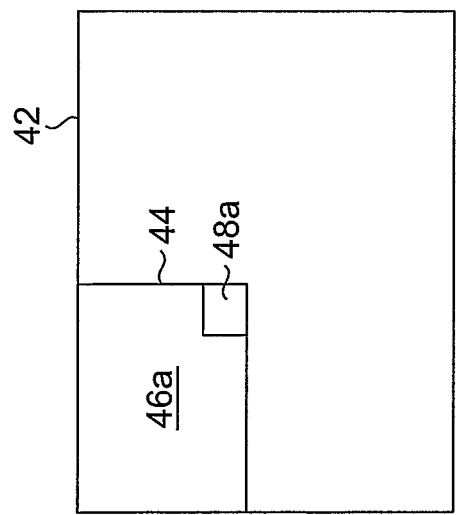
Figure 4C:
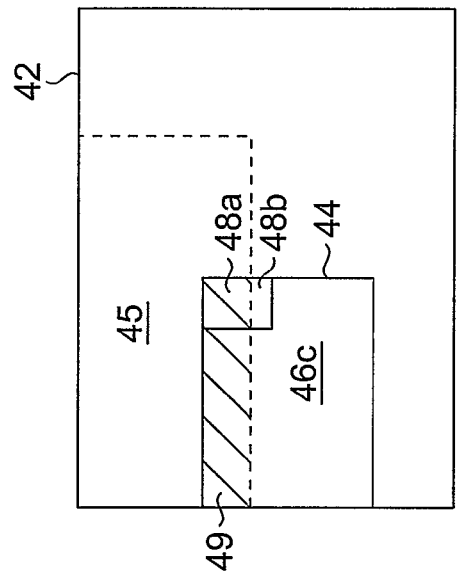
Figure 4D:
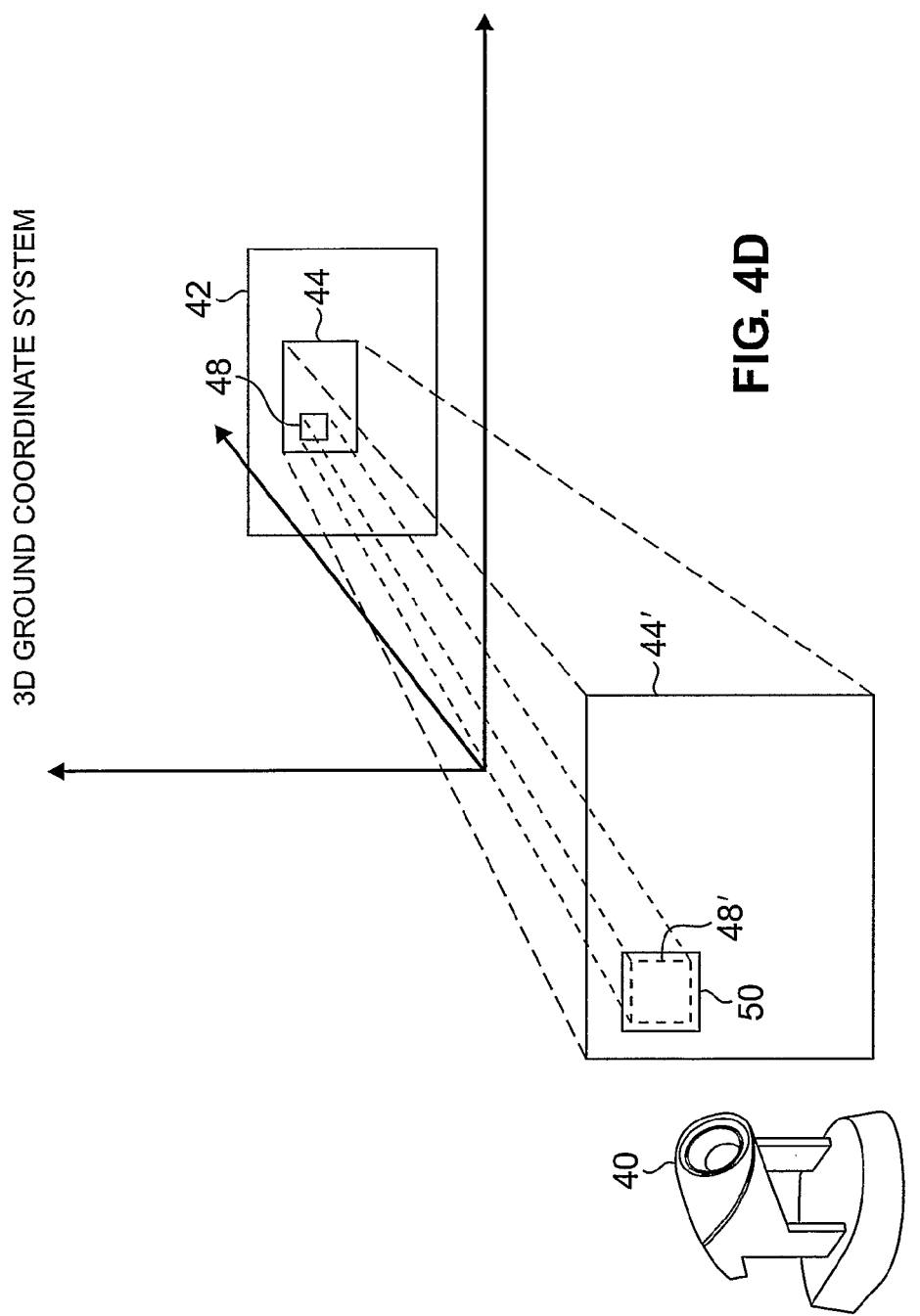

FIGS. 4A-4E show another exemplary embodiment of the present invention, in which accurate mapping of mapped region of interest is maintained by using image feedback regarding the current field of view of the surveillance camera. That is, the current field of view is compared to a composite image representing the entire possible field of view to determine the location of the current field of view within the entire possible field of view, and therefore the locations of regions of interest with locations defined with respect to the composite field of view. FIGS. 4A-4C show how the composite image of the entire possible field of view is constructed. FIGS. 4D-4E show how the composite image is used to provide feedback to the camera, allowing proper remapping of mapped region of interest.

FIGS. 4A-4C shows entire possible field of view 42 available to camera 40 (shown in FIGS. 4D-4E), along with current field of view 44. To create composite image 45 of entire possible field of view 42, camera 40 moves through the entire possible field of view 42, and captures images 46a, 46b . . . 46N (images 46) which combined provide information regarding entire possible field of view 42. Images 46 are combined to create a composite field of view that is coextensive with the entire possible field of view.

The process begins with the compilation of individual images 46a, 46b . . . 46N (images 46) together representing the entire possible field of view 42 of camera 40. In the preferred embodiment, camera 40 is set to the highest magnification during scanning and capturing of individual images 46 (i.e., zoom is maximized). This provides more information regarding each image 46, which in turn makes image registration discussed in the next step easier. Therefore, camera 40 is moved through the entire range of motions available to camera 40, such that the compilation of individual images 46 is coextensive with entire possible field of view 42. As camera 40 scans, camera motion is inferred by correlation of successive images. For example, as shown in FIG. 4A, original image 46a (coextensive with current field of view 44) is captured by camera 40. Because original image 46a is the first image captured, there is no composite image to compare it with, so image 46a is stored as composite image 45 (shown in FIGS. 4B-4C with dashed line). A portion of image 46a is determined to be a region of interest, designated region of interest 48a. Storing image 46a as composite image 45 includes storing the location of region of interest 48a with respect to composite image 45. Location of a subsequently defined region of interest (not shown) is also stored with respect to composite image 45.

Camera 40 is then moved to a new location as part of the scanning of entire possible field of view 42, and therefore current field of view 44 is moved to a new location as shown in FIG. 4B. Successive image 46b is then captured by camera 40. Successive image 46b is compared with composite image 45 (consisting so far of original image 46a). Image registration or comparing of the two images detects correlations between composite image 45 and successive image 46b as shown by shaded region 47, allowing successive image 46b to be aligned with composite image 45. The portion of successive image 46b that does not overlap with composite image 45 (the right part of successive image 46b outside of shaded region 47) is added to the now growing composite image 45.

In FIG. 4C the process is continued, as camera 40 moves to a new location resulting in a new location of current field of view 44 within entire possible field of view 42. A new successive image 46c is captured by camera 40, successive image 46c is compared to composite image 45. As shown in FIG. 4C, composite image 45 represents a combination of previously captured images 46a and 46b. Image registration detects a correlation between the top portion of successive image 46c and the bottom portion of composite image 45, shown by shaded region 49, allowing successive image 46c to be aligned with composite image 45. The portion of successive image 46c that does not overlap with composite image 45 (the bottom part of successive image 46c outside of shaded region 49) is added to composite image 45. A portion of successive image 46c is determined to be a region of interest, designated region of interest 48b. Adding successive image 46c to composite image 45 includes storing the location of region of interest 48b with respect to composite image 45. In FIGS. 4D-4E region of interest 48a and 48b are referred to as simply region of interest 48.

This process continues with each successive image being compared to the composite image, until the entire possible field of view has been recorded in the composite image. An example of this method is described in the article by F. Candocia, 'Synthesizing a Panoramic Scene with a Common Exposure via the Simultaneous Registration of Images.' FCRAR 2002, Miami, Fla., May 23-24, 2002. Further examples of methods of creating composite images are available, for instance, in Image Mosaicing and Super-resolution by David Capel, Springer, 1st edition, Jan. 9, 2004. If a camera is capable of more than 360° of pan or tilt, then the synthesizing of the composite image stops when wrap around is detected by a correlation of both edges of a new image.

While compiling the composite image, the locations of any regions of interest are recorded with respect to the composite image, as are any subsequent definitions of regions of interest. In this way, regions of interest are defined with respect to images within the ground coordinate system.

FIGS. 4D-4E illustrate the use of image feedback using the composite image to determine the location of regions of interest 48. FIGS. 4D-4E show camera 40, along with entire possible field of view 42, current field of view 44, and region of interest 48 in the ground coordinate system. Current field of view 44 and region of interest 48 are projected onto the camera coordinate system as imaged current field of view 44' and imaged region of interest 48'. Mapped region of interest 50 is determined using image feedback provided by comparing imaged current field of view 44' with composite image 45 (which is coextensive with entire possible field of view 42)

constructed as discussed above with respect to FIGS. 4A-4C. Comparison of images is done with correlation algorithms, which indicate the best match between imaged current field of view 44' and a corresponding portion of composite image 45. An example of one such algorithm that may be used is described in the article by B. Reddy and B. Chatterji, 'An FFT-based Technique for Translation, Rotation, and Scale-Invariant Image Registration', IEEE Trans. Image Proc., v. 5, pp 1266-1271, August 1996. The algorithm employs Fast Fourier Transforms ("FFT") to convert both imaged current field of view 44' and the composite image to frequency domain data, which allows for easy searching and matching of images. Although FFT's present a computationally inexpensive and quick way of comparing images, it is not the only method that may be employed in registration techniques. Other registration methods include (1) algorithms that use low-level features such as edges and corners, e.g., feature based methods and (2) algorithms that use high-level features such as identified objects or relations between features. Further examples of registration techniques are available, for instance, in 2-D and 3-D Image Registration by A. Ardeshir Goshtasby, Wiley-Interscience, 2005. A high correlation between imaged current field of view 44' and a portion of the composite image 45 signals overlap of the two images, and determination of the orientation of camera 40. As discussed above, when compiling composite image 45, regions of interest 48 are also mapped to composite image 45. After determining the orientation of camera 40, region of interest 48 defined with respect to composite image 45 may be located. Because region of interest 48 is defined with respect to composite image 45, and camera 40 reorients itself with respect to the composite image 45 after each move, movement in camera 40 has no effect on the mapping of mapped region of interest 50 to be coextensive with imaged region of interest 48'.

After the orientation (i.e., pan, tilt, and zoom values) of camera 40 has been determined, camera 40 is able to determine whether region of interest 48 is located within current field of view 44. If region of interest 48 (or portions thereof) is located within current field of view 44, and therefore imaged region of interest 48' is located within imaged current field of view 44', mapped region of interest 50 is selected to be coextensive with imaged region of interest 48'. Mapped regions of interest 50 are defined based on location data regarding region of interest 48 stored during compilation of the composite image. Because the present invention determines orientation based on comparison of current field of view 44 with the composite image representing the entire possible field of view 42 of camera 40, camera motion no longer results in a disconnect between mapped region of interest 50 and imaged region of interest 48'.

Figure 5:
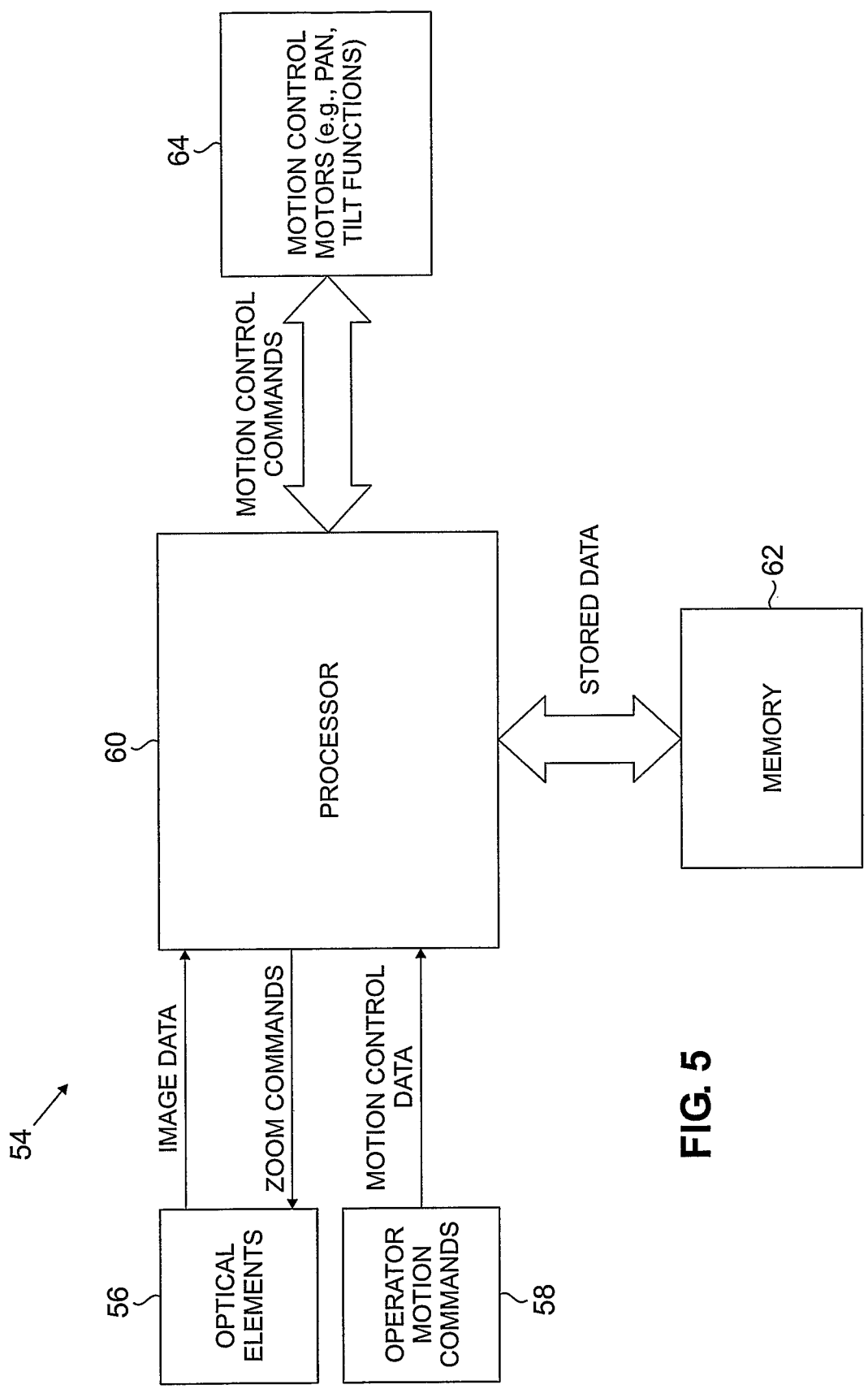
FIG. 5 is a functional diagram of the components located within the PTZ camera.

FIG. 5 shows an exemplary embodiment of system 54, which may be used to implement the embodiments of the present invention shown in FIGS. 3A-3B and FIGS. 4A-4E. The functional components of system 54 may provide mechanical feedback functionality, image feedback functionality, or both. System 54 includes optical elements 56, operator motion commands 58, processor 60, memory 62, and motion control motors 64.

Image data from optical element 56 is provided to processor 60. Processor 60, depending on the situation performs a number of operations on image data received from optical element 56. For instance, if image feedback is being employed as discussed with respect to FIGS. 4A-4E, processor 60 stores to memory 62 successive images sufficient to compile composite image 45. Algorithms described above to stitch together composite image 45 may be implemented with hardware or software within processor 60. After composite image 45 has been stitched together, it is stored to memory 62. Registration algorithms to determine current orientation of the camera based on a comparison of the current field of view of image provided by optical element 56 and the composite image stored in memory 62 are also performed by processor 60. Registration algorithms may be performed by a combination of hardware and software within processor 60. Similarly, after the current orientation of the camera is determined and one or more regions of interest are located, processor 60 performs video processing techniques on video images corresponding with the regions of interest.

Operator motion commands 58 provides data to processor 60 regarding movement instructions for the surveillance camera (i.e., instructions regarding pan, tilt and zoom functions). Data received from operator motion commands 58 is used by processor 60 to provide movement instructions to motion control motors 64. Motion control motors 64 provides the motive force to pan, tilt, or zoom the surveillance camera. In one embodiment, mechanical feedback is based on data received from operator motion commands 58, as this represents desired movements of the surveillance camera. In another embodiment, feedback is received from motion control motors 64 regarding the actual movement carried out by motion control motors 64.

A surveillance camera system has been described that uses feedback (either mechanical or image or a combination of both) to determine the proper location of the mapped region of interest despite movement or motion of the surveillance camera. Although the embodiments described above employed a single surveillance camera, multiple surveillance cameras could of course be implemented. Similarly, while functional components were discussed as being located locally on a surveillance camera, in other embodiments processing and storing of images would be done remotely on a computer system composed of both hardware and software components.

Although the present invention has been described with reference to preferred embodiments, workers skilled in the art will recognize that changes may be made in form and detail without departing from the spirit and scope of the invention.

The invention claimed is:

1. A method for maintaining proper mapping of a mapped region of interest with respect to a region of interest in a field of view imaged by a surveillance camera, the method including:
   detecting a change in the surveillance camera that causes the surveillance camera to image a new field of view;
   receiving feedback that includes an actual mechanical motion of the surveillance camera;
   determining a new position for the mapped region of interest from the feedback, wherein the new position is based on an inverse relationship between the change in the surveillance camera and a location of the region of interest within the new field of view; and
   remapping the mapped region of interest based on the new position such that the mapped region of interest corresponds with the location of the region of interest.

2. A system for maintaining proper mapping of a mapped region of interest with respect to a region of interest in a field of view imaged by a surveillance camera, the system comprising:
   a memory that stores instructions; and
   a processor coupled to the memory and configured to execute the instructions to perform a method comprising:
      detecting a change in the surveillance camera that causes the surveillance camera to image a new field of view;
      receiving feedback that includes an actual mechanical motion of the surveillance camera;
      determining a new position for the mapped region of interest from the direction and the magnitude included in the feedback, wherein the new position is based on an inverse relationship between the change in the surveillance camera and a location of the region of interest within the new field of view; and
      remapping the mapped region of interest based on the new position such that the mapped region of interest corresponds with the location of the region of interest.

3. The system of claim 2, further comprising:
   a motion control motor that receives instructions from the processor to control orientation of the surveillance camera.

4. A method for maintaining a mapped region of interest in a proper location, the method comprising:
   compiling a database of images representative of a total possible viewing area available to a camera;
   using the database of images to complete a composite field of view of the total possible viewing area available to the camera;
   defining a region of interest with respect to a location of the region of interest within the composite field of view;
   moving the camera to a current field of view within the total possible viewing area available to the camera;
   performing an image analysis on the current field of view and the composite field of view to determine an orientation of the camera and location of the region of interest within; and
   setting a mapped region of interest to be coextensive with the location of the region of interest.

5. The method of claim 4, wherein compiling a database of images includes:
   moving the camera through the total possible viewing area available to the camera; and
   storing the images as the camera moves through the total possible viewing area corresponding to the total possible field of view of the camera at the highest magnification level.

6. The method of claim 5, wherein using the database of images to complete a composite field of view includes:
   comparing the stored images using image registration techniques; and
   using the result of the image registration techniques to create the composite field of view.

7. The method of claim 4, wherein performing an image analysis on the current field of view and the composite field of view to determine an orientation of the camera includes:
   performing a fast Fourier transform on both the current field of view and the composite field of view;
   providing frequency domain results of the fast Fourier transform to a correlation algorithm; and
   determining with the correlation algorithm where the current field of view is located within the composite field of view.

8. The method of claim 7, wherein after determining where the current field of view is located within the composite field of view, the method includes:
   using the locations of the region of interest defined with respect to the composite field of view to determine the location of the region of interest with respect to the current field of view.

9. The method of claim 8, where setting the mapped region of interest to be coextensive with the location of the region of interest is determined with respect to the current field of view.

10. A system for maintaining proper mapping of a mapped region of interest with respect to a region of interest, the system comprising:
    a memory having instructions stored thereon; and
    a processor coupled to the memory and configured to execute the instructions to perform a method comprising:
        receiving feedback regarding motion of a surveillance camera and remapping the mapped region of interest based on an inverse relationship between movement of the surveillance camera and a location of the region of interest within a current field of view of the surveillance camera such that the mapped region of interest corresponds with the region of interest;
        compiling a database of images representative of a total possible viewing area available to a camera;
        using the database of images to complete a composite field of view of the total possible viewing area available to the camera;
        defining a region of interest with respect to a location of the region of interest within the composite field of view;
        moving the camera to a current field of view within the total possible viewing area available to the camera;
        performing an image analysis on the current field of view and the composite field of view to determine an orientation of the camera and location of the region of interest within; and
        setting a mapped region of interest to be coextensive with the location of the region of interest.

\* \* \* \* \*